United States Patent [19]

Campbell

[11] 4,365,876
[45] Dec. 28, 1982

[54] MOTION PICTURE CAMERA

[76] Inventor: Rouel R. Campbell, 7064 E. 52nd St., Tulsa, Okla. 74145

[21] Appl. No.: 944,919

[22] Filed: Sep. 22, 1978

[51] Int. Cl.$^3$ .............................................. G03B 1/00
[52] U.S. Cl. .................................... 352/84; 352/185; 352/216; 352/156
[58] Field of Search ................. 352/84, 185, 165, 216, 352/156; 242/193, 194

[56] References Cited

U.S. PATENT DOCUMENTS

| | | | |
|---|---|---|---|
| 1,884,605 | 10/1932 | Dina | 352/165 |
| 2,614,456 | 10/1952 | Zeuthen | 352/185 |
| 3,554,635 | 1/1971 | Milliken | 352/185 |
| 3,625,406 | 12/1971 | Campbell | 226/55 |
| 3,637,298 | 1/1972 | Whitley | 352/84 |
| 3,893,757 | 7/1975 | Donnici | 352/156 |
| 4,083,516 | 4/1978 | Schuch et al. | 242/193 |

*Primary Examiner*—Monroe H. Hayes
*Attorney, Agent, or Firm*—Head, Johnson & Stevenson

[57] ABSTRACT

A motion picture camera of the type which advances the film through a film gate in a stop-and-go motion and particularly designed for high speed operation, and comprising a film drive mechanism having a sprocket and two guide assemblies for forming and guiding a loop of film through the film gate, one of the guide assemblies being mounted on an eccentric for continuous rotation while moving the loop of film against a stationary registration pin in intermittent fashion, the registration pin being disposed for insertion through a perforation of the film when the eccentric crosses dead center, and the other guide assembly being a compact structure for cooperating with the first guide assembly to reduce any accumulation of the composite error in the perforations of the film; the camera is also constructed in two sections which are removably secured together by a release mechanism which is readily separable by one hand of the operator of the camera, one section of the camera containing a film supply reel and take-up reel having a self-contained reel spacer interposed therebetween and the film guide apparatus, and the other section of the camera containing power devices and an adjustable shutter arranged for producing a greater shutter time during exposure of each frame of the film, and an appropriate lens system, the film gate including a film channel along the wall of the magazine and being characterized by having a zero clearance construction and remaining in substantially fixed relation to the lens mounting, and the film drive mechanism also being formed to drive through the sprocket and the film and including a novel take-up friction drive in constant engagement with the take-up reel.

8 Claims, 24 Drawing Figures

MOTION PICTURE CAMERA

BACKGROUND OF THE INVENTION

1. Field of the Invention

This invention relates to improvements in cameras, and more particularly, but not by way of limitation, to a motion picture device adapted to move the film therethrough in intermittent stop-and-go motion and containing an improved film drive system for effecting such movement at exceptionally high speeds.

2. Description of the Prior Art

Heretofore, high-speed motion picture cameras in which the film is advanced intermittently, one frame at a time, have been beset by many difficulties and problems. One of the major problems with such high-speed picture cameras resides in the need for overcoming the inertia as the film and associated parts are caused to accelerate between the stop-and-go operations. This change of inertia not only causes the need for additional energy to be placed in the system, but also places a heavy strain on all of the moving parts. Accordingly, it is desirable to minimize the number of moving elements which undergo such rapid changes in velocity during the stop-and-go movement of the film through the film gate.

In addition, other operational areas of cameras of this type are constantly in need of further improvement, when possible, and these include the film drive mechanism whereby it is desirable to achieve high-speed operation with a minimum of power, and yet provide for synchronized movement of the irregular relationship between the supply reel and the take-up reel. Accordingly, it is desirable to utilize a minimum of moving parts in such drive, yet provide reliable operation, and facility of use, i.e. change of reels for use of the camera with multiple reels at one time.

Another problem that has arisen in motion picture cameras resides in the tendency of the film to bow somewhat so that a cylindrical concavity appears on the emulsion side of the film. It is therefore desirable to provide a film gate that tends to flatten out the film so as to provide a better focal plane at the film gate, yet which does not injure the emulsion or provide undue frictional drag as the film passes through the gate.

SUMMARY OF THE INVENTION

The present invention contemplates a novel motion picture camera and the like which has been particularly improved or designed and constructed for overcoming or greatly reducing the foregoing disadvantages. In accordance with the invention, an improved film drive mechanism is provided which is especially suitable for motion picture cameras, but which is also applicable to use in projectors. The film drive mechanism contains a sprocket means engaging the film travelling toward the film gate and engaging the film moving away from the film gate so as to provide a typical film loop on each side of the sprocket with the film loop going through the film gate. In this way the film can travel at a substantially constant linear speed over the sprocket means and yet move in a stop-and-go movement through the film gate by virtue of the compensating movements in the loop itself. The sprocket means may comprise a plurality of sprockets, but preferably a single sprocket is used, with the sprocket having suitable teeth for engaging the perforations provided on each side of the film strip and providing power to move the film toward and away from the film gate. Right hand and left hand film rollers are disposed in the proximity of the sprocket for bearing against the opposite or outer surface of the film passing over the sprocket in order to assure a more efficient engagement of the sprocket with the perforations of the film for assuring a more accurate registration of the film moving through the film gate.

Instead of the typical claw system moving the film in the halting stop-and-go motion, this invention utilizes an eccentric guide for the film loop on one side of the film gate cooperating with a compensating guide for the film loop on the other side of the film gate so as to control the film loop and provide conversion from a constant linear movement of the film to a stop-and-go movement at the film gate. The compensating film loop guide is of a more compact construction for reducing the accumulation of the composite error in the perforations, and the stationary register pin provided on the film gate is positioned so as to be inserted into a perforation when the eccentric crosses dead center, or is at the bottom of its travel.

The eccentric guides are two precision ball bearings mounted on the eccentric shaft and spaced to engage the film at its outer edges and dynamically balanced to provide a substantially vibration free rotation, which is not possible with the claw "pull down". The crank rollers serve the same purpose as the conventional claw pull down with the advantage of using the full strength of the film and combining with the sprocket during the pull-down time. This system makes possible the loading of the upper loop spring with a substantially frictionless film pull spring. With this construction, the rollers are simply synchronized to the sprocket means so as to provide a relatively simple mechanism containing parts rotating in a substantially constant speed, yet providing the proper conversion of the film travel for substantially constant linear movement to a stop-and-go linear movement at the film gate and back to a substantially constant linear movement. The drive connection between the sprocket and the take-up reel and the coefficient of friction variables are reduced by providing a drive roller of relatively small diameter in engagement with the outer periphery of the take-up reel, said drive roller having a relatively hard outer periphery bearing against the take-up reel with light pressure whereby relatively little friction is necessary for the driving of the take-up reel.

It is thus seen that a primary object of the present invention is to provide an improved film drive mechanism having a relatively simple construction for converting film movement from linear to the desired halting motion through the film gate and back to linear movement for rewind, said substantially constant velocity allowing for high speed movement with a minimum of strain, said high speed movement being approximately three hundred frames per second.

Another object of this invention is to provide a registration pin capable of cooperation with an eccentric drive for holding the film in a stationary position during exposure at the film gate, with the registration pin being constructed to function without movement thereof, and so positioned as to provide a pull down of approximately 100° of the shutter angle, with an exposure time substantially equal to a 180° revolution of the shutter.

A further object of the invention is to provide an improved drive for the take-up reel which is driven through a gear train in connection with the sprocket member and which includes a relatively small drive roller having a hard outer periphery in engagement with the outer periphery of the relatively large diameter take-up reel for applying relatively light driving pressure thereagainst, thus providing a low coefficient of friction, and a more efficient take-up reel operation.

Still another object of this invention is to provide a film drive mechanism of the character described which is capable of operating at relatively high speeds with a minimum of power input.

Preferably, the registration pin is mounted on the housing or main frame so as to be stationary with respect to the camera, and the film drive mechanism is constructed so that the eccentric crank not only provides the stop-and-go movement of the film, but also moves the film into and out of engagement with the registration pin. With this construction, the registration pin does not have to move back and forth in reciprocating fashion as each frame passes as in the conventional registration pins, and the extreme forces due to the high acceleration of the pin are thereby avoided.

In the preferred camera constructed according to the present invention, the camera is also constructed in easily separable parts so that the motor drive, lens system and shutter may be provided in one part of the camera, and the reel units together with their film drive mechanism may be provided in another section. This construction allows the operator to make rapid changes of film by utilizing the same main camera section with different spools of film already set up in driving relation. It is well known to facilitate reel changes, but heretofore the need of threading the film through the film guide means in the film gate has presented a problem. In accordance with the present invention, the film drive mechanism is completely provided in one portion, together with the film gate, and is particularly designed so that the change of film in no way changes the focus set by the object lens or the camera mount. The latching mechanism is particularly constructed and arranged for release by one hand of the operator of the camera for further facilitating the changing of the film.

It is therefore still another object of the invention to provide a novel two-piece camera construction in which the film drive mechanism is provided separately from the motor and shutter drive and associated parts, said two-piece construction being formed for accurate and rapid assembly with assured synchronization of the film drive mechanism and shutter mechanism, and having release means operable by one hand of the operator of the camera whereby the magazine section of the camera may be readily separated from the main section thereof.

Yet another object of the invention is the provision of a camera of the character described in which the film gate is formed with guide means providing a path having a width corresponding to the width of the film in the location of the aperture whereby the film is held in a flat configuration thereat, but without binding or excessive friction.

DESCRIPTION OF THE PREFERRED EMBODIMENTS

Referring to the drawings in detail, reference character 10 generally indicates a motion picture camera comprising two completely separable sections 12 and 14. The section 12 may be referred to as the magazine section and is provided with a suitable door 15 removably secured to one side thereof in any suitable or well known manner, such as that shown in my aforementioned U.S. Pat. No. 3,625,406, issued Dec. 7, 1971, and entitled "Motion Picture Camera and the Like:, for providing access to the interior thereof. The section 14 may be referred to as the main section and comprises a main housing 16 for supporting a suitable object lens assembly 18, shown in broken lines in FIG. 1, adapted to fit over an aperture 20 provided in the housing 16, with the housing 16 cooperating with the section 12 to provide a compact camera assembly. The section 14 also contains a suitable motor 22 (FIG. 5) for providing power to the various moving parts. The motor 22 as shown herein is preferably an electric motor supplied through a typical appliance cord (not shown). As will become more apparent hereinafter, section 14 also contains a shutter 24 synchronized to provide a speed dependent upon the speed of the motor 22, and a power-coupling means 26 for transmitting mechanical power from the section 14 to the section 12.

The section 12 comprises a housing 28 having an aperture 30 provided therein to correspond with the aperture 20 of the housing 16 whereby said apertures provide for exposure of the film at a film gate 32. The section 12 also comprises a film drive means 34 adapted to receive power from the power-coupling means 26 and drive a film strip 36 through the film gate 32 in stop-and-go fashion.

Figure 5:
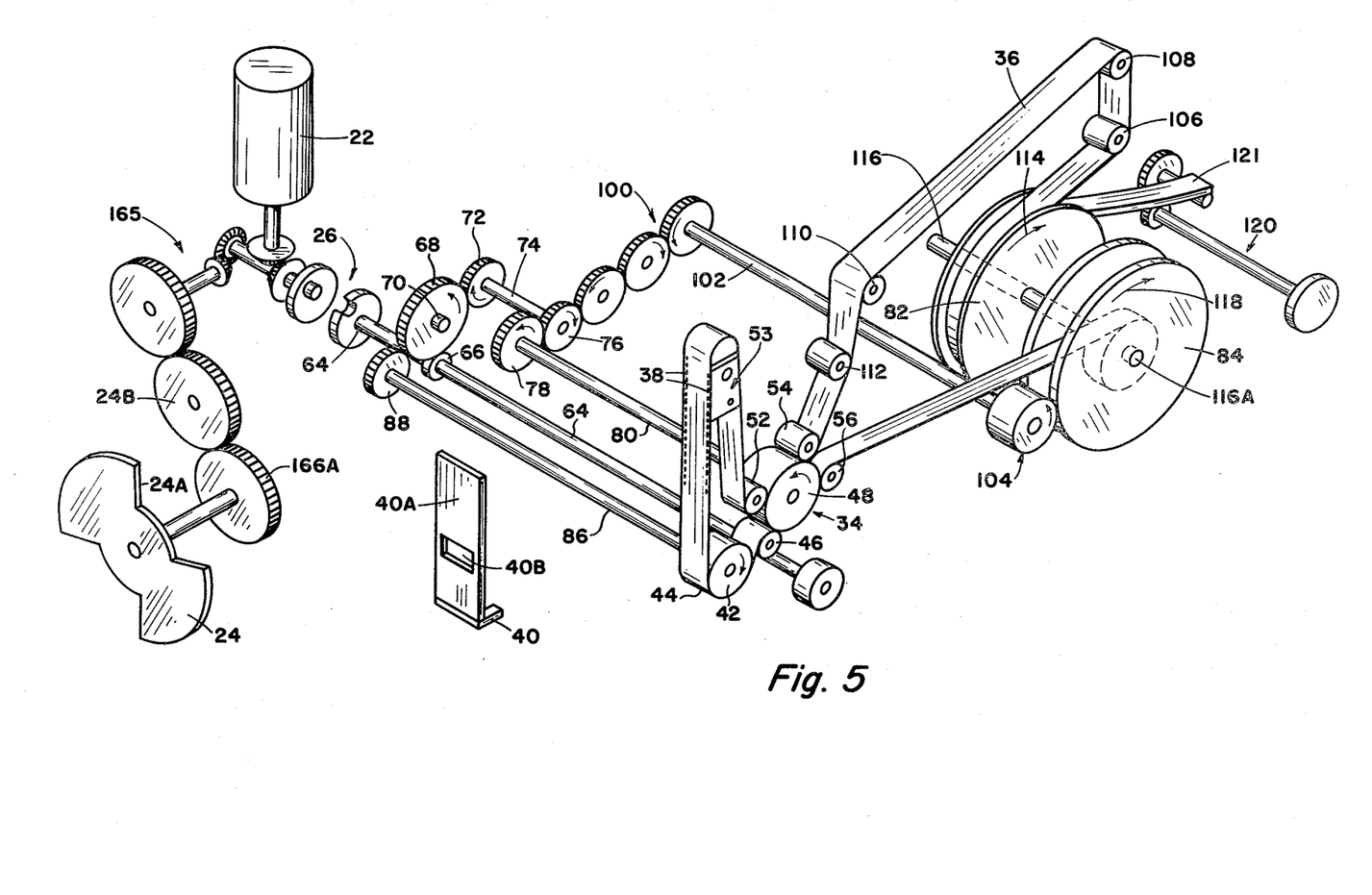
FIG. 5 is a perspective view of the film transport construction of a movie camera embodying the invention together with a diagrammatic illustration of the shutter position with respect to the film gate.
Figures 7, 8, 9, 10, 11, 12:
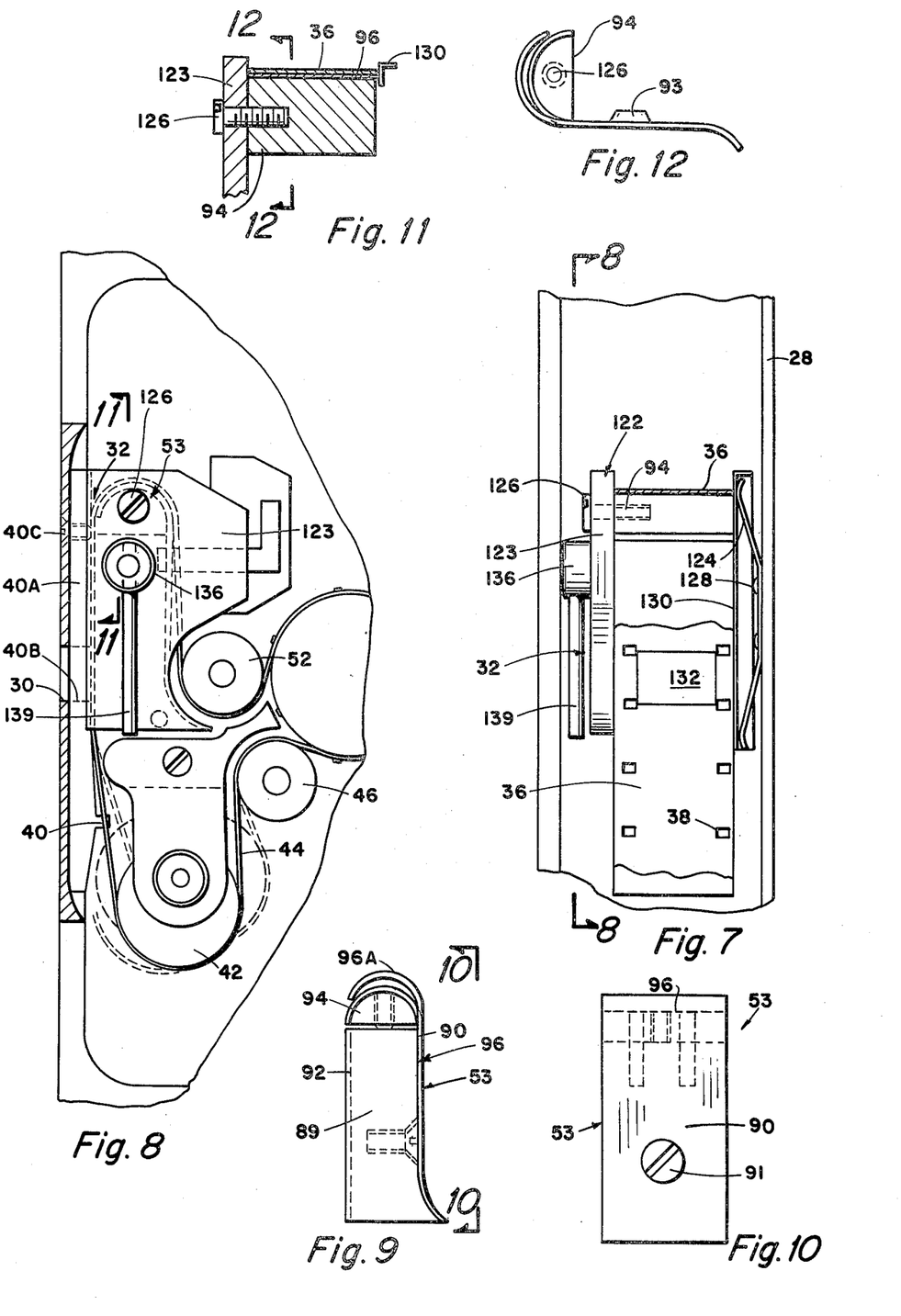
FIG. 7 is an elevational view of a portion of the film drive mechanism illustrating the manner in which the film passes through the film gate.
FIG. 8 is a view taken on line 8—8 of FIG. 7.
FIG. 9 is a side elevational view of a combination spring and block for low and high speed operation, with portions shown in broken lines for purposes of illustration.
FIG. 10 is a view taken on line 10—10 of FIG. 9.
FIG. 11 is a view taken on line 11—11 of FIG. 8.
FIG. 12 is a view taken on line 12—12 of FIG. 11.

As is well known, the usual film 36 is provided with a plurality of longitudinally spaced perforations or holes 38 along at least one side or edge thereof, and preferably along with both sides thereof as particularly shown in FIGS. 5 and 7. The invention provides means for preventing lengthwise movement of the film strip 36 while a picture is being taken, said means comprising a film drive means 34 and a registration pin means 40 mounted on the housing 28 for engagement with the holes 38 of the film 36 for holding the film stationary when a hole is so engaged, said registration pin 40 cooperating with said film drive means 34. It is preferable that the registration pin means 40 include a pair of substantially identical transversely spaced pin members for simultaneously engaging the aligned holes 38 on the opposite sides of the film strip 36, but only one of the pins 40 is shown herein.

The film drive means 34 comprises an eccentrically mounted wheel means or crank means 42 positioned for contacting the film strip 36 and moving same laterally back and forth thereby causing the moving film to periodically engage and disengage the registration pin 40, substantially as set forth in my aforementioned patent. This type operation may be referred to as a beater system, and the eccentrically mounted wheel means 42 operates by engaging a loop 44 of the film 36 formed by passing the film over a guide roller 46 which is interposed between the eccentric wheel 42 and a drive sprocket 48. The wheel or roller 46 facilitates maintaining of the film strip 36 in an efficient engagement with the sprocket 48 for assuring an efficient driving of the film strip with a minimum of slack in the film and for facilitating the reduction of stretch in the film strip during the movement of the film through the drive means 34.

The wheel means 42 comprises a pair of precision ball bearings mounted on an eccentric shaft 43 in spaced relation for simultaneously engaging the opposite side edges of the film loop 44 during a pull down operation, with the bearings being dynamically balanced to provide a substantially vibration free action. The bearings cooperate with the sprocket 48 during the pull down operation, thus using the full strength of the film. When the eccentric 42 has passed its lowermost position (shown in solid lines in FIG. 8), the eccentric moves out of driving engagement with the bottom loop of the film, but the sprocket 48 continually drives the film strip in a forward direction. The eccentric 42 does not engage the loop again until the eccentric passes over the uppermost position, as shown in broken lines in FIG. 8, and begins its downward movement. At this time, the eccentric 42 engages the bottom loop and moves the loop in a direction toward the register pin means 40 for engagement of the pin means with the properly aligned perforations 38. Upon engagement of the pin means 40 with the perforations 38, the forward movement of the loop portion of the film is interrupted to provide the stop-and-go movement for the film at the film gate 32.

Figure 4:
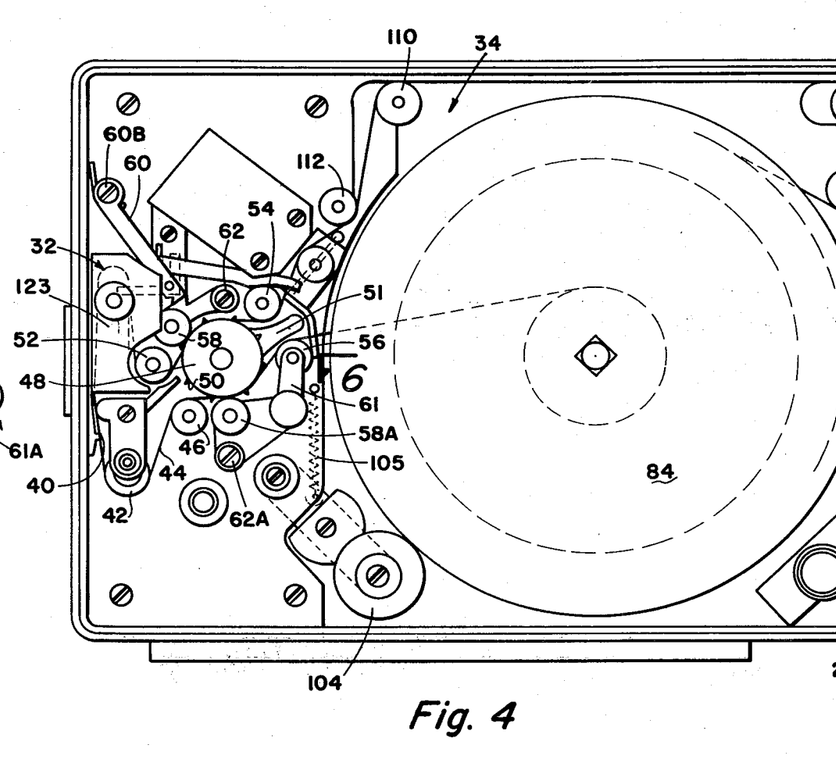
FIG. 4 is a side elevational view of the camera shown in FIG. 1 with the cover removed for illustration of the internal parts.

As shown herein, the sprocket means 48 comprises a single sprocket member having a plurality of circumferentially spaced outwardly extending teeth 50 provided around the outer periphery of each end thereof for engagement with the holes or perforations 38 of the film 36, as is well known. However, it is to be understood that the sprocket means may comprise multiple sprockets instead of a single sprocket if desired, so long as the film is fed toward the loop 44 and is taken away from the loop 44 at a substantially constant velocity. The sprocket 48 is also preferably provided with a substantially centrally disposed circumferential groove on the outer periphery thereof interposed between the two rows of teeth 50 for slidably receiving one end of a suitable stripper 51 therein, as is well known. The loop 44 is formed by moving the film 36 around a guide roller 52, a compensating guide assembly means 53, the eccentrically mounted wheel means 42, and the guide roller 46, and back to the sprocket means or member 48. Other suitable guide rollers such as rollers 54 and 56 cooperate with the roller 52 in order to direct the film 36 through a desired path and insure engagement with the sprocket 48 as set forth in my aforementioned patent. In addition, left hand and right hand film rollers 58 and 58A are carried by suitable film roller arms 60 and 61 which are pivotally secured to the housing 28 at 62 and 62A, respectively (FIG. 4). The arms 60 and 61 are yieldably urged in a direction for a pressure engagement of the rollers 58 and 58A against the outer surface of the film 36 moving over the sprocket 48 as shown in FIG. 4. This further assures an efficient engagement of the teeth 50 with the perforations 38 as the film engages the opposite sides of the sprocket 48 during movement of the film 36 through the drive apparatus 34. The arms 60 and 61 may be of substantially any desired configuration, such as shown at 60A and 61A in FIG. 20, and may be selectively pivoted in a direction for removing the rollers 58 and 58A from engagement with the film 36 when desired.

Figure 20:
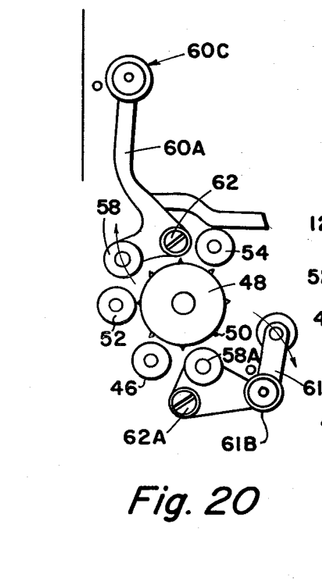
FIG. 20 is an elevational view of a portion of the film drive assembly illustrating a modified film roller arm structure.
Figure 21:
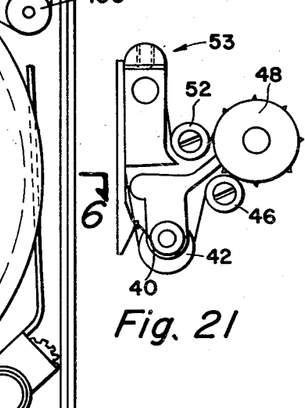
FIG. 21 is an elevational view of a modified film drive assembly portion as may be utilized in a motion picture camera embodying the invention.

The arm 60 is provided with a spring load plunger lock device 60B at the outer end thereof for locking the arm 60 in a preselected position, and the arm 60A is similarly provided with a lock device 60C. The arm 61 is similarly provided with a plunger lock device 61B for locking the arm 61 in a preselected position. When the plunger lock devices 60B and 61B are engaged, the rollers 58 and 58A are in engagement with the film strip 36 and sprocket 48 as shown in FIG. 4. When the plunger lock devices 60B and 61B are disengaged the rollers 58 and 58A are removed from engagement with the film strip and sprocket as shown in FIG. 20.

Referring more specifically to FIG. 5, it will be apparent that a shaft 64 receives power from the coupling means 26, and the shaft 64 is part of and provides power for the film drive means 34. The shaft 64 drives a gear 66 which in turn drives a gear 68 carried by a suitable stub shaft 70 which may be secured to the housing 16 in any well known manner (not shown). The gear 68 in turn drives a gear 72 carried by a shaft 74 which also carries a gear 76 disposed in spaced relation to the gear 72. The gear 76 drives a gear 78 carried by a shaft 80 which in turn carries the sprocket 48 at the opposite end thereof. The sprocket 48 then drives the film strip 36 from a supply reel 82 and onto a take-up reel 84 in a manner as will be hereinafter set forth in detail. The sprocket 48 also feeds the film 36 into the loop 44 at a substantially constant velocity, and takes the film from the loop at the exact same velocity, the exact length of the loop being fixed by the engagement of the sprocket with the film strip 36 as set forth in my aforementioned patent.

The movement of the section of the film loop passing through the film gate 32, as shown in FIGS. 4 and 8, is regulated by the eccentrically mounted wheel means 42 and by the compensating guide means 53, which are formed to provide stop-and-go motion of the section of the loop therebetween. As shown herein, the eccentrically mounted wheel 42 is positively driven by a shaft 86 (FIG. 5) which may be keyed or otherwise secured to a gear 88 for rotation simultaneously therebetween, and the gear 88 is driven by the gear 68.

The structure of the sprocket 48, eccentrically mounted wheel 42 and guide rollers 46, 52, 54 and 56 may be of any suitable type as set forth in my aforementioned patent, but it is preferable that the outer periphery of each roller be of a slightly concave longitudinal configuration to provide an emulsion relief for all which receive the film strip 36 thereover, thus assuring an efficient handling of the film strip 36 during its movement through the drive apparatus 34. In addition, the compensating guide assembly 53 as shown in FIGS. 8 through 12 preferably comprises a housing 89 having a pair of oppositely disposed substantially straight and mutually parallel surfaces 90 and 92 for receiving the film strip 36 thereover. The lower portion of the surface 90, as viewed in FIG. 9, is preferably outwardly flaring or arcuate for gently receiving the film strip 36 thereon from the guide roller 52. A suitable half-roller or semicylindrical member 94 is mounted on the upper end of the housing 89 and is reciprocally secured thereto in any suitable manner. The walls or surfaces 90 and 92 are of a width substantially equal to the width of the film strip 36, and a suitable loop spring 96 is secured to the surface 90 by a screw 91, or the like. The spring 96 is of a cross-sectional contour or configuration corresponding to the outer surface 90 and lies snugly thereagainst for receiving the film strip thereon. A detent portion 93 is provided in the spring 96 for receiving the head of the screw 91 therein in order that the screw 91 will not engage the surface of the film passing over the surface of the spring 96.

One end 96A of the spring 96 is curved or arcuate corresponding to the contour of the outer surface of the element 94, and is spaced slightly therefrom in the normal relaxed position of the spring as shown in FIG. 9. It is to be noted that the spacing illustrated in FIG. 9 is exaggerated for purposes of illustration since the spacing between the element 94 and the curved portion 96A of the spring 96 is very slight for a purpose as will be hereinafter set forth. The loop spring 96 is preferably constructed from a highly polished metal, such as clock spring, and is of a width substantially equal to the width of the film strip 36 passing through the drive apparatus 34.

As the ecentric roller or wheel means 42 moves through its eccentric path, as indicated by the broken line positions therefor in FIG. 8, the film 36 is pulled outwardly and downwardly and then over the registration pin 40. As hereinbefore set forth, this action may be referred to as a beater system. The pin 40 is positioned with respect to the wheel 42 whereby the pin 40 will be inserted through a perforation 38 substantially exactly when the eccentric 42 reaches dead center at the end of its pull of the film 36. The compensating assembly 53 is provided so as to allow the film to be pulled downwardly by the eccentrically mounted wheel means 42 and otherwise compensate for the movement thereof. The pull-down on the film causes the spring 96 to move against the abutment member 94 and the spring 96 maintains the film efficiently taut during the stop portion of the stop-and-go movement at the film gate 32. It is to be understood that the eccentrically mounted wheel 42 is formed to pull the film downward, while the pin means 40 holds the film in a substantially stationary position for the period of time as the eccentric goes back toward the original pull down position, as set forth in my aforementioned patent. As the film is pulled down, the loop spring 96 of the compensating means allows for the pull down, and then takes up slack during the hold or stationary position of the film so as to get ready for the next pull down operation. With the structure shown herein it has been found that a pull down of a maximum of 100° of rotation of the shutter 24 is possible, and a frame rate of approximately 300 perforations per second. Of course, the shutter opening or aperture angle 24A must be increased with respect to the normal aperture angle whereby the overall angle of the shutter angle will be approximately 90° double shutter, equalling approximately 180° shutter time. A few degrees are allowed for the film to stabilize in the register pin 40.

FIG. 8 shows the eccentric 42 in its bottom position in solid lines, and a plurality of other positions therefor in broken lines. When the eccentric 42 has reached it bottom position and stopped pulling loop 44 through the film gate 32, the spring 96 of the compensating guide 53 is depressed, as hereinbefore set forth, and the loop 44 is displaced its maximum distance downward, as shown in solid lines in FIG. 8. It should be noted that the film 36 is pulled away from the loop to the bottom side of the sprocket 48 at the same time it is advanced toward the loop 44 by the upper portion of the sprocket 48, as viewed in the drawings, so that the length of the film in the loop 44 remains constant at all times. As hereinbefore set forth, both the crank or eccentric 42 and the sprocket 48 contribute and cooperate to advance the film during the pull down operation. It should also be noted that the pin 40 is inserted through or engaged with the perforations 38 at the moment the eccentric 42 reaches the bottom or dead center position thereof when the movement of the film 36 is stopped.

When the eccentric 42 leaves the bottommost position, the film 36 is once against advanced through the free upper loop until the eccentric 42 has once again made contact with the bottom loop to begin the next pull down to repeat the cycle. It will thus be seen that the portion of the loop 44 passing through the film gate is moved in alternate stop-and-go motion. Reciprocating motion of the registration pin is completely eliminated as set forth in my aforementioned patent, and the registration pin is active during the halting period to positively hold the film during the entire exposure thereof. The compact structure of the loop compensating spring assembly 53 reduces the accumulation of the composite error in the perforations of the film strip, and the right hand and left hand rollers 58 keep the film tight against the sprocket 48 for a more accurate registration of the film. The large contact area of the spring 96 with the film 36 reduces the pressure per square inch on the film 36 thereby reducing stretching of the film and other adverse effects normally present with the relatively high pressures acting on the film. The movement of the spring 96, as is compresses or depresses, follows the movement of the film, thus reducing resistance to the movement of the film through the drive assembly 34. It is also to be noted that the distance between the sprocket 48 and the registration pin 40 is relatively short, thereby reducing the composite error between the perforations 38 of the film 36.

Figure 13:
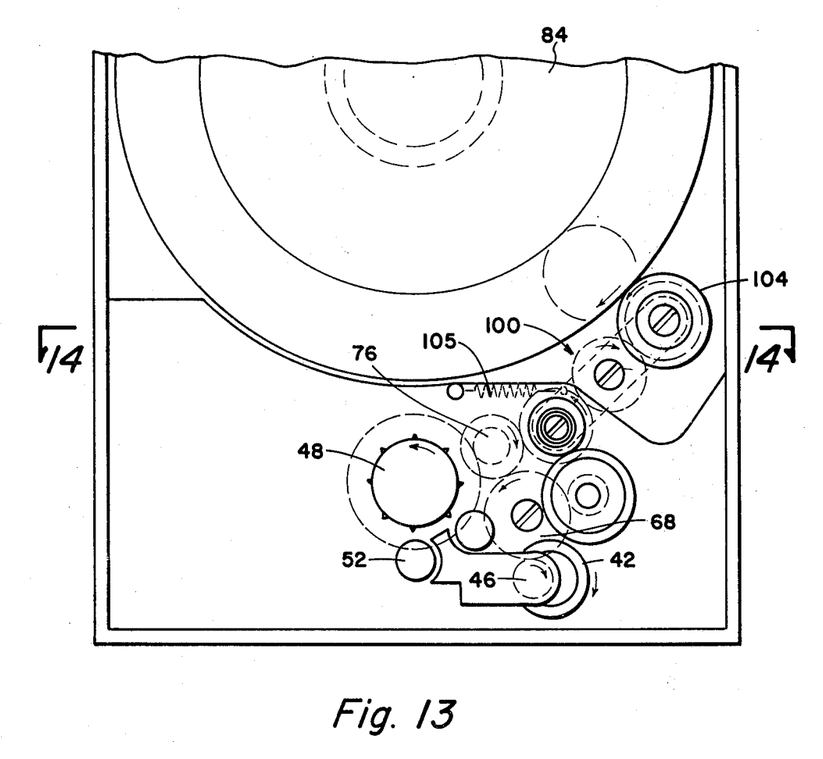
FIG. 13 is a side elevational view of a portion of a take-up reel and lower loop and eccentric member and portions of the film drive assembly for a motion picture camera embodying the invention.
Figure 14:
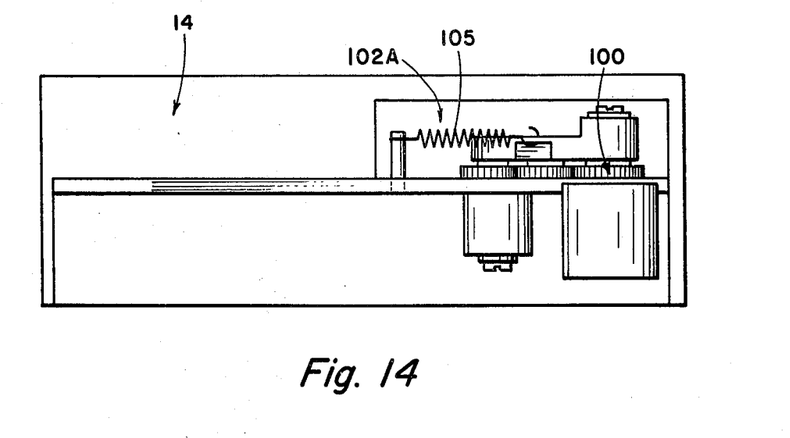
FIG. 14 is a view taken on line 14—14 of FIG. 13.

Referring to FIGS. 4, 5 and 13, it will be seen that the present invention also provides an apparatus for moving the film 36 longitudinally from the supply reel 82, through the film gate 32, and to the take-up reel 84. A gear-train drive system generally indicated at 100 is operably engaged with the gear 76 for actuation thereby to rotate a shaft 102 about its own longitudinal axis. A friction roller 104 is carried at one end of the shaft 102 and the outer periphery of the roller 104 is in constant engagement with the outer periphery of the take-up reel 84 for transmitting rotation to the reel 84. The friction roller 104 is preferably constructed of a hard metal, or the like, for reducing the friction between the reel 84 and the roller 104, and the diametric size of the wheel or roller 104 is particularly selected in order that the core of the take-up reel 84 rotates through one revolution during the advance of one wrap of the film around the core of the reel 82, see particularly FIG. 4. The wheel 104 is suitably connected with a helical spring 105 whereby the roller is constantly urged against the outer periphery of the reel 84 and whereby the pressure of the roller 104 against the reel 84 is determined by the tension of the spring 105, which is preferably very light. Of course, suitable release means (not shown) is provided for holding the roller 104 out of engagement with the reel 84 during removal of the reel, or the like, as is well known.

The film strip 36 is directed from the supply reel around a plurality of rollers 106, 108, 110 and 112 and around the roller 54 to the drive sprocket 48 as particularly shown in FIG. 5. The forward rotation of the sprocket 48 pulls the film from the reel 82 and causes the reel 82 to rotate in the direction indicated by the arrow 114. The reel 82 is preferably freely journalled on a suitable shaft 116 in any suitable manner for facilitating the rotation of the reel 82. The reel 84 is also journalled on a similar shaft 116A, and is disposed in spaced relation to the reel 82. The reel 84 rotates in the direction indicated by the arrow 118.

A suitable film counting mechanism, generally indicated at 120 is preferably provided in the section 12 and includes a finger 121 which rides on or is in engagement with the outer periphery of the film wound on the core of the reel 82, as particularly shown in FIG. 5, and actuates a suitable visual counter (not shown) for indicating the quantity of unexposed film remaining in the camera 10 to be exposed, or for indicating the quantity of film remaining in the camera which has not been exposed, as desired and as is well known.

The register pin means 40 as shown herein is preferably carried by or is integral with a plate member 40A having an aperture 40B provided therein corresponding to the apertures 20 and 30. The plate 40A may be secured to the inner periphery of the housing 28 in any suitable manner, such as by screws 40C, and properly orientated so as to align the aperture 40B with the aperture 20. In this manner, the register pin means 40 is secured to the housing 28, as hereinbefore set forth.

The film gate comprises a guide means generally indicated at 122 (FIGS. 7 and 8) formed with a width corresponding to the width of the film in the location of the aperture 30 and for holding the film in a flat configuration at the aperture 30. A first post abuttment or film edge guide member 123 extends along one side of the guide 122, and the semicylindrical abutment member 94 is secured thereto by a suitable fastening screw 126, or the like, in such a manner that the member 94 extends substantially perpendicular from the abuttment member 123, thus securing the compensating guide 53 to the abuttment 123 with the surface 92 thereof being disposed in the proximity of the plate 40A. The film strip 36 passes along the surface 92 and is held in a firm flat position in the stationary position of the film during exposure thereof. A film guide spring 124 is secured to the inner periphery of the housing 28 by suitable screws 128, and is oppositely disposed from the abutment 124, as particularly shown in FIG. 7. A film guide 130 is supported by the spring 124 and extends longitudinally along the length of the film strip portion disposed in the guide 122 throughout a relatively long distance for reducing the pressure per square inch applied along the side edge of the film strip. When the film strip 36 is stopped at the film gate, a single frame 132 of the film 36 will be positioned in alignment with the apertures 20, 30 and 40B for exposure, as is well known.

Figures 15, 16, 17, 18, 19:
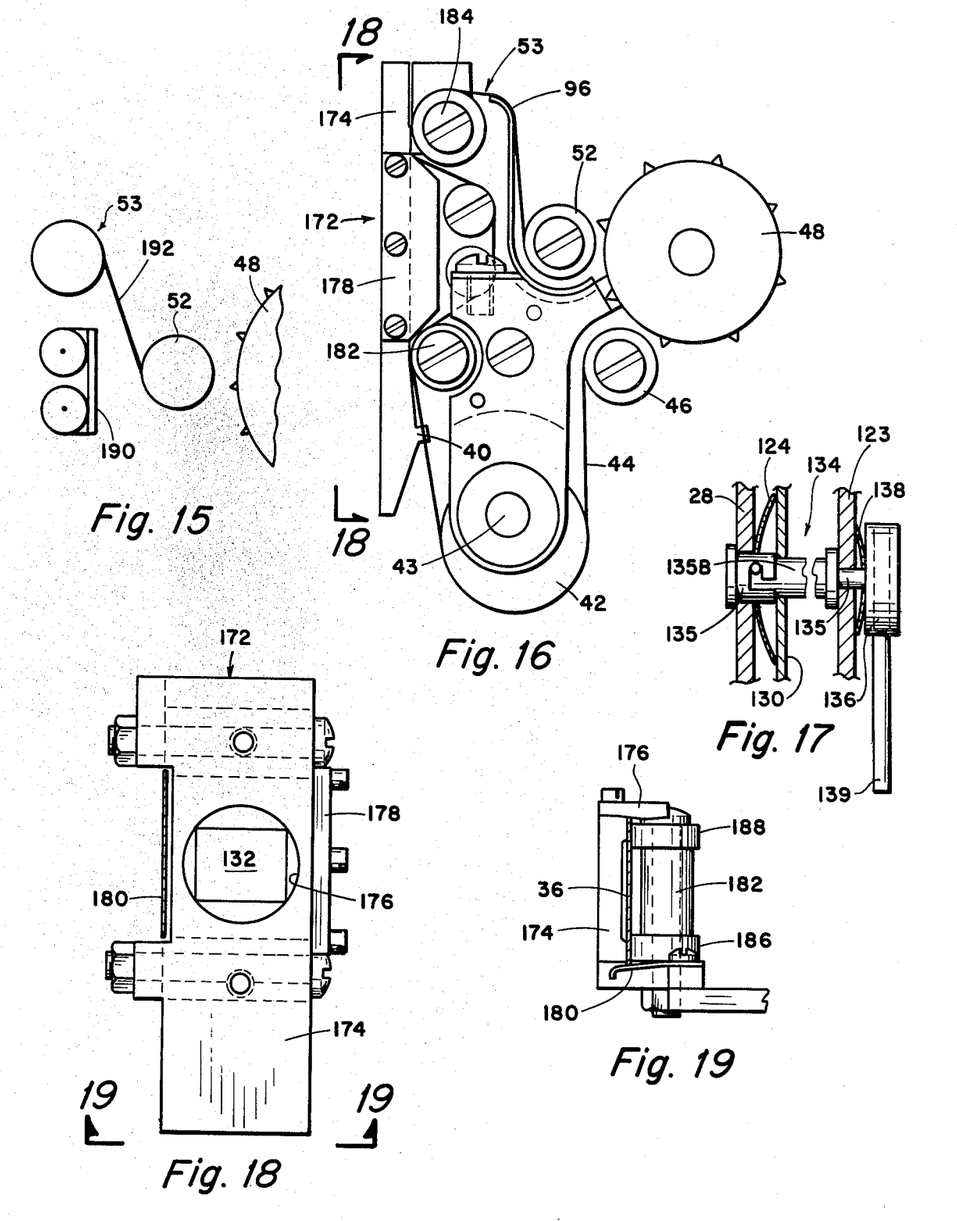
FIG. 15 is a side elevational view of a drive sprocket and light shield as utilized in one embodiment of a motion picture camera embodying the invention.
FIG. 16 is a side elevational view of a modified lower loop and eccentric drive portion of the film drive assembly of a motion picture camera embodying the invention.
FIG. 17 is an elevational view, partly in section, of a bayonet lock and spring washer utilized in a camera embodying the invention.
FIG. 18 is a view taken on line 18—18 of FIG. 16.
FIG. 19 is a view taken on line 19—19 of FIG. 18.

The guide 122 is secured in position within the housing 28 by a bayonet type locking device generally indicated at 134 (FIG. 17). The device 134 comprises a first connection element 135 extending into the interior of the housing 28 and having the usual L-shaped bayonet slot 135A provided therein for receiving a second connection element 135B for cooperation therewith. The second connection element 135B is rotatably secured between the abuttment member 123 and the first connection element 135 and is provided with an axially extending stem member 135C extending rotatably through the abuttment 123 for connection with a suitable knob member 136. A suitable spring washer 138 is interposed between the outer periphery of the abuttment 123 and the inner face of the knob 136, and a suitable handle or operator element 139 extends radially outwardly from the knob 136 for manual rotation of the knob 136 in order to actuate the bayonet connection members 135 and 135B. It has been found that threaded-type connection members frequently are subject to the vibrations of the operation of the camera and tend to loosen, whereas the bayonet type connection as shown herein securely retains the elements in the desired operational position during operation of the camera 10.

Figure 6:
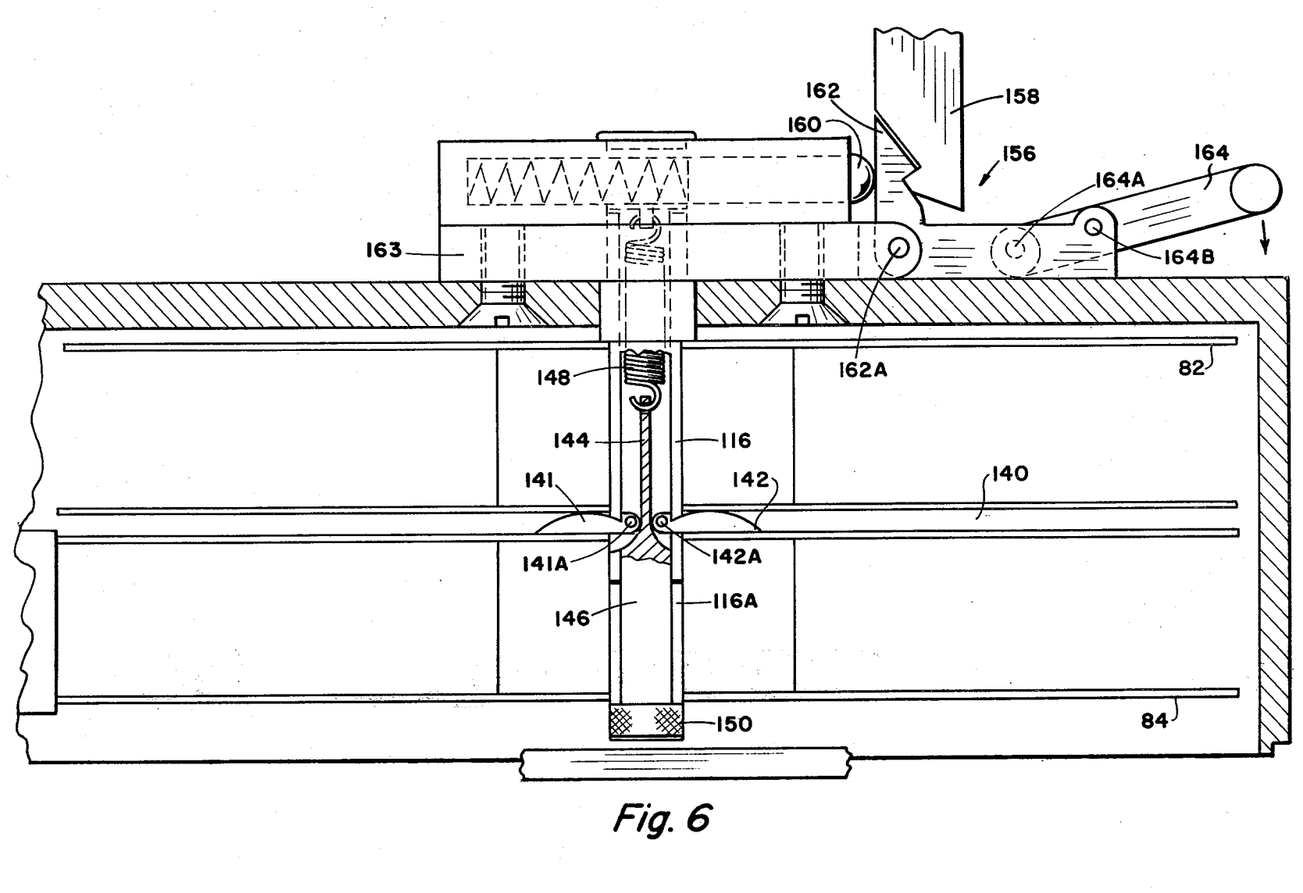
FIG. 6 is a sectional view taken on line 6—6 of FIG. 4.

Referring to FIG. 6, a built-in space 140 is provided between the reels 82 and 84, and a plurality of radially extending spring members 141 and 142 are disposed in the space 140 for bearing against each reel to retain the reels securely in the selected spaced position. The width of the space 140 is determined by the distance between the reels 82 and 84 on the shafts 116 and 116A, and the springs 141 and 142 are pivotally or hingedly secured at 141A and 142A, respectively, to a neck member 144 of a stud member 146 which extends slidably in the hollow shafts 116 and 116A. The inner end of the neck 144 is suitably engaged with one end of a suitable helical spring 148 which is anchored in the shaft 116 in any well known manner, and the outer end of the stud 146 is provided with a knurled knob 150. When the spacer springs 141 and 142 are in the radially outwardly extending position shown in FIG. 6, the reels 82 and 84 are held securely in the spaced relation. When it is desired to load or remove a reel, or the like, the knob 150 may be manually grasped for pulling the stud 146 against the force of the spring 148, whereupon the springs 141 and 142 will be pivoted to a position against the outer periphery of the neck 144 and to a position within the interior of the shaft 116A. When the knob 150 is released, the spring 148 will return the stud 146 and springs 141 and 142 to the position shown in FIG. 6.

Figure 22:
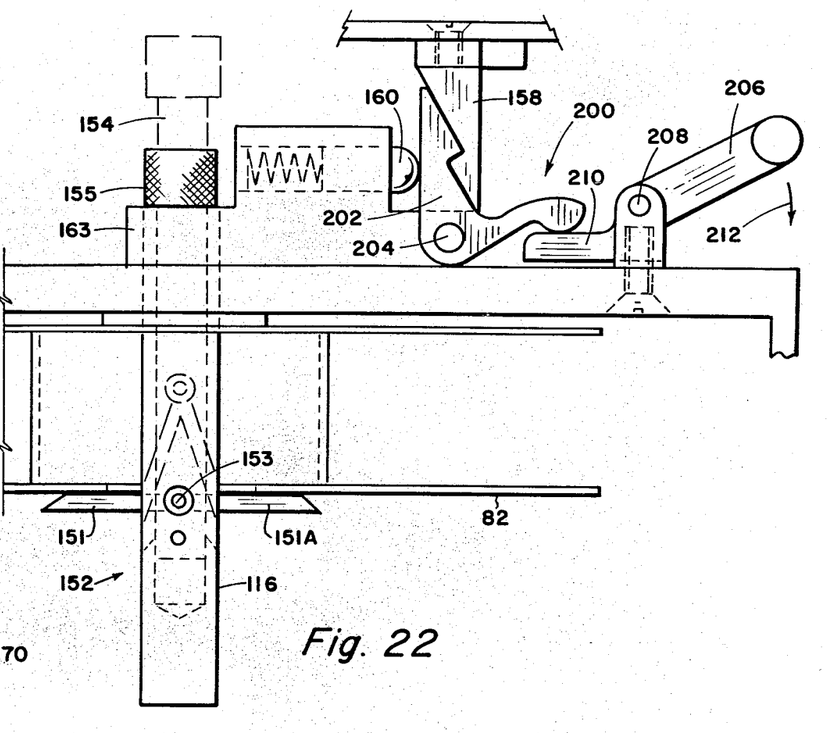
FIG. 22 is an elevational view of a modified reel spacer as may be utilized in a motion picture camera embodying the invention.

A modified spacer device for the reels 82 and 84 is generally indicated at 152 in FIG. 22. The device 152 comprises a stud member 154 reciprocally disposed within the shaft 116 and movable between the positions shown in solid lines and broken lines. A plurality of radially outwardly extending spacer fingers 151 and 151A are pivotally or hingedly secured to the stud 154 and 153. A knurled knob 155 is provided on the outer end of the stud 154 for the same purpose as the knob 150. In the radially extended position of the fingers 151 and 151A shown in solid lines in FIG. 22, the reels 82 and 84 are securely retained in spaced relation. When the knob 155 is manually pulled in a direction away from the outer wall of the housing 28, the fingres 151 and 151A are pivoted to the position shown in broken lines for disposition within the shaft 116. The reels may then be removed, loaded, or the like. When the knob is returned to the position shown in solid lines, the fingers 151 and 151A are returned to the spacing position.

Also shown in FIGS. 6 and 22 is a release apparatus 156 operable by one hand of the user of the camera for readily releasing the engagement between the two sections 12 and 14. This feature is particularly useful when the camera is utilized under conditions requiring rapid film changing, but when one hand of the operator is otherwise engaged, such as in military aircraft, or the like. The latch mechanism as shown herein preferably comprises a fixed latch member 158 mounted on one section, such as the section 14, and a yieldable retractable release element 160 mounted on the other section. A latch engaging member 162 is pivotally mounted at 162A on a block 163 secured to the housing 28, and a release lever 164 is pivotally secured at 164A and 164B to the latch engaging member 162 whereby manual movement of the lever 164 is a direction indicated by the arrow 164C will cause the member 162 to pivot about the point 162A in a direction against the force of the latch member 160 for disengagement from the latch member 158, thus releasing the engagement between the sections 12 and 14. The retractable release element 160 normally bears against the outer edge of the side of the latch engaging member 162 for maintaining the latch members 162 and 158 in mutual engagement for securely locking the sections 12 and 14 together. The release lever member 164 may be readily depressed with one hand for release of the engagement between the latch members 162 and 158 while maintaining a firm grip on the magazine section 12.

Figures 23, 24:
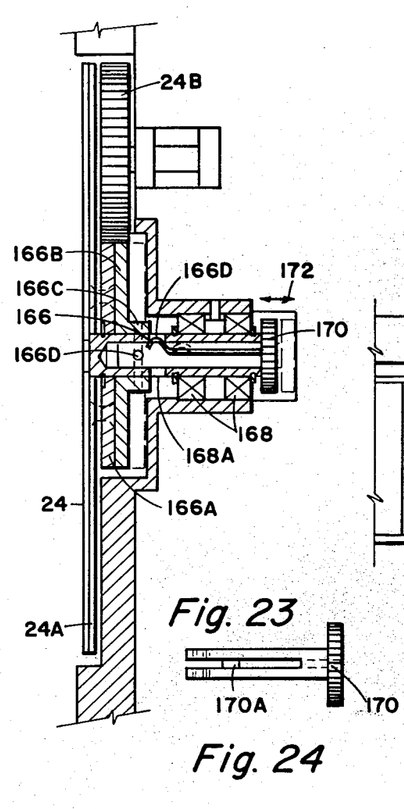
FIG. 23 is an elevational view, partly in section, of a shutter adjustment apparatus utilized in the invention.
FIG. 24 is a side elevational view of an adjuster element utilized in the shutter adjustment apparatus shown in FIG. 23.

As is well known, the shutter 24 is rotated about its central axis in synchronization with the movement of the film loop 44 through the film gate 32 whereby the shutter apparatus 24A is always in alignment with the apertures 20, 30 and 40B when the film has been stopped in the film gate. The shutter 24 as shown herein is driven by a suitable gear train generally indicated at 165 in FIG. 5 and which is operably connected between the motor 22 and a shutter drive gear 24B. A sleeve 166 is suitably secured to the inwardly directed face of the shutter 24 and extends axially outwardly therefrom and is suitably supported by bearings 168 for rotation about its longitudinal axis. A gear 166A is riveted or otherwise rigidly secured to the inwardly directed face of the shutter 24 for simultaneous rotation therebetween and is in constant driving engagement with the gear 24B. A second gear 166B is disposed on the shaft 168 and the hub 166C thereof is secured to the shaft 168 by a pin 166D. The gear is independent of the gear 166A for a purpose as will be hereinafter set forth. A slotted adjustment pin 170 is slidably disposed within the sleeve 168 and is movable in reverse directions as indicated by the arrow 172. A plurality of circumferentially spaced bores 168A (preferably two diametrically opposed holes) are provided in the sidewall of the sleeve 168 for receiving one end of a detent spring 170A therein, said spring 170A being carried by the pin 170. The pin 166C extends through the bifurcated inner end of the pin 170, thus securing the gear 166B to the pin 170. The pin 166C extends through diametrically opposed slots (not shown) provided in the sleeves 168, for permitting movement of the gear 166B between the position shown in solid lines in FIG. 24 to the position shown in broken lines. When the pin 170 is pulled with sufficient force for overcoming the force of the spring 170A, the pin may be moved to the position shown in broken lines, whereupon the gear 166B is simultaneously moved to the broken line position shown in FIG. 22. In this position the gear 166B is out of driving engagement with the gear 24B, and the shutter 24 may be manually angularly adjusted for positioning the shutter aperture 24A at the desired location. When the proper adjustment has been made, the pin 170 may be returned to the position shown in solid lines, whereupon the detent spring will engage one of the apertures 168A for locking the pin in position in order to retain the gear 166B in the position shown in solid lines. The gear 166B is then in driving engagement with the gear 24B, and the actuation of the gear train 165 efficiently rotates the shutter 24 in the proper synchronization, as is well known.

Referring now to FIGS. 16 through 19, a modified film gate is generally indicated at 172 which comprises a plate 174 generally similar to the plate 40A for supporting the register pins 40. The plate 174 may be secured to the housing 28 in the same manner as hereinbefore set forth whereby the aperture 176 provided in the plate 174 will be in alignment with the apertures 20 and 30 for permitting proper exposure of the film frame 132. A film guide or abuttment member 178 is secured along one side edge of the plate 174 for engagement with one side edge of the film strip 36, and a film guide spring 180 is suitably secured to the plate for yieldable engagement with the opposite side edge of the film strip. A pair of spaced rollers 182 and 184 are secured in the section 12 for receiving the film 36 thereover and are preferably provided with film engaging flanges 186 and 188 at the opposite ends thereof for engaging the opposite edges of the film strip during movement of the film through the gate 172.

As particularly shown in FIG. 15, in the event the compensating spring 96 is not utilized, it is desirable to provide a light shield 190, which may be suitably secured in the proximity of the film gate for protecting the oncoming portion 192 of the film strip 36 from exposure when the shutter 24 is actuated for exposing the film frame 132 at the shutter aperture.

A modified release mechanism for the sections 12 and 14 is generally indicated at 200 as shown in FIG. 22, and comprises a latch member 202 pivotally secured to the block 163 at 204 for engaging the release element 160 in the same manner as the latch member 162. A release lever 206 generally similar to the lever 164 is pivotally secured to the housing 28 at 208 and is provided with a latch engaging member 210 on the inner end thereof. When the latch 206 is depressed against the outer periphery of the housing 28, or moved in the direction indicated by the arrow 212, the latch engaging member 210 pivots the latch 202 in a direction against the force of the release latch member 160 for releasing the engagement between the latches 158 and 202, thus releasing the section 12 from the section 14.

Figures 1, 3:
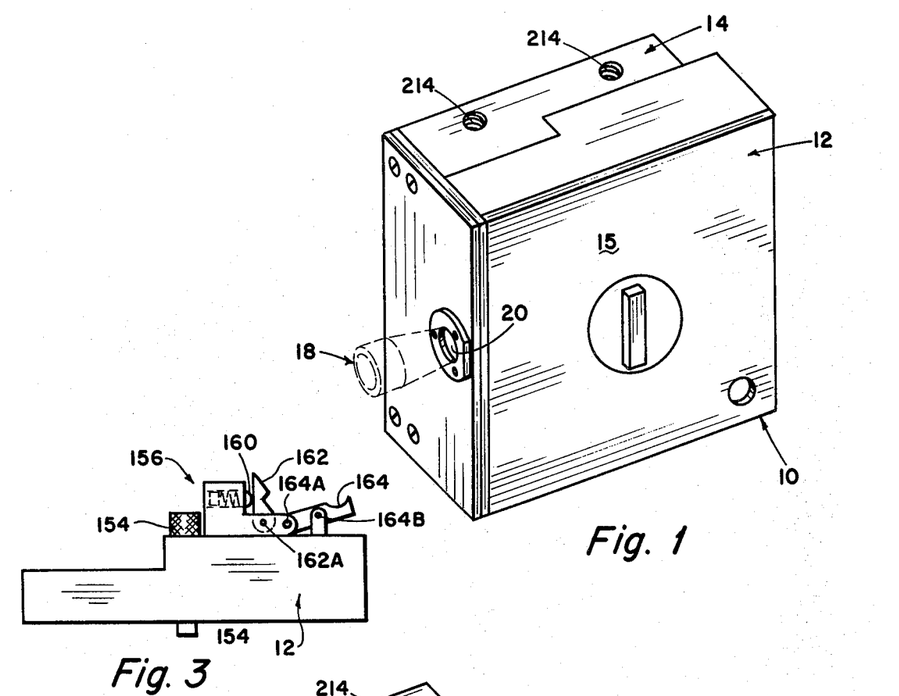
FIG. 1 is a perspective view of a movie camera embodying the invention.
FIG. 3 is a plan view taken on line 3—3 of FIG. 2.
Figure 2:
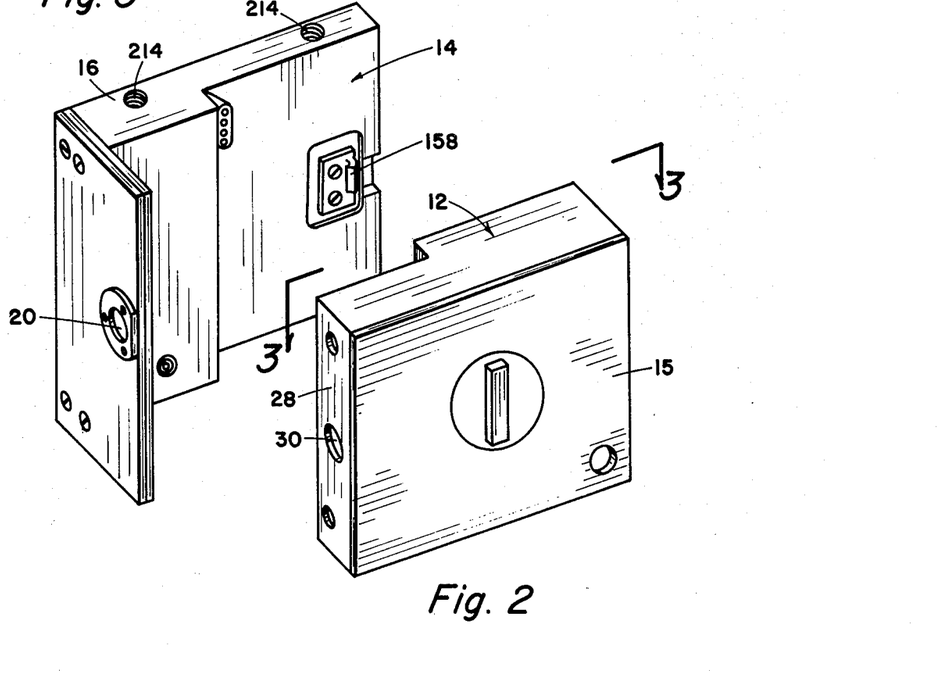
FIG. 2 is a perspective view of a movie camera embodying the invention and illustrated with the two sections thereof disengaged with respect to each other.

It will be apparent that suitable mounting holes 214 may be provided in the housing 16, if desired, and as shown in FIG. 1. The holes 214 are preferably tapped or provided with internal threads for receiving suitable screws (not shown) therein for facilitating mounting of the camera 10 on a suitable structure, such as a tripod (not shown) or other suitable stable element, as is well known.

From the foregoing it will be apparent that the present invention provides a motion picture camera having an improved film handling means wherein the film strip is moved through the camera at high speed in an efficient manner, with a stop-and-go motion, and so arranged and constructed as to provide a substantially vibration free, exceptionally high speed operation, and without the previously inherent disadvantages associated with high speed motion picture camera operation.

Whereas the present invention has been described in particular relation to the drawings attached hereto, it should be understood that other and further modifications, apart from those shown or suggested herein may be made within the spirit and scope of this invention.

What is claimed is:

1. A high speed motion picture camera comprising a power section operably connected with a film carrying section, release means cooperating between the two sections for selective disengagement therebetween and operable by one hand for facilitating said disengagement, a shutter means operably connected with the power section, said film carrying section including a film drive apparatus for moving the film from a film supply reel to a film take-up reel, means provided in the film drive apparatus for forming a film loop, a film gate for receiving the film loop therethrough, stationary register pin means provided in the film gate means for intermittent engagement with the film loop for intermittently stopping the forward movement of the film loop during exposure of a single frame of the film during activation of the shutter means, eccentric means engagable with a portion of the film loop in a beater action for intermittently pulling a preselected length of the film through the film gate and for intermittently engaging the film with the register pin means, yieldable compensating means receiving the film loop thereover for compensating for inconsistencies in the film and maintaining the film taut in the stopped position of the loop, said compensating means including film engaging spring means complementary to the size of the film for receiving the film thereagainst and applying yieldable pressure thereon for maintaining said taut condition therefor, and wherein the film drive means includes positive drive means engagable with the take-up reel for driving thereof, and wherein the positive drive means comprises a relatively small diameter roller engagable with the outer periphery of the take-up reel, said roller member being yieldably engaged with the reel for reducing the driving engagement pressure therebetween.

2. A high speed motion picture camera as set forth in claim 1 wherein the outer periphery of the small diameter roller is relatively hard for providing a low coefficient of friction during driving of the take-up reel.

3. A high speed motion picture camera comprising a power section operably connected with a film carrying section, release means cooperating between the two sections for selective disengagement therebetween and operable by one hand for facilitating said disengagement, a shutter means operably connected with the power section, said film carrying section including a film drive apparatus for moving the film from a film supply reel to a film take-up reel, means provided in the film drive apparatus for forming a film loop, a film gate for receiving the film loop therethrough, stationary register pin means provided in the film gate means for intermittent engagement with the film loop for intermittently stopping the forward movement of the film loop during exposure of a single frame of the film during activation of the shutter means, eccentric means engagable with a portion of the film loop in a beater action for intermittently pulling a preselected length of the film through the film gate and for intermittently engaging the film with the register pin means, yieldable compensating means receiving the film loop thereover for compensating for inconsistencies in the film and maintaining the film taut in the stopped position of the loop, said compensating means including film engaging spring means complementary to the size of the film for receiving the film thereagainst and supplying yieldable pressure thereon for maintaining said taut condition therefor, and wherein the stationary register pin means is disposed in a particular spaced relation with respect to the eccentric means whereby the film is engaged with the register pin substantially at the end of the pull of the eccentric on the film loop.

4. A high speed motion picture camera comprising a power section operably connected with a film carrying section, release means cooperating between the two sections for selective disengagement therebetween and operable by one hand for facilitating said disengagement, a shutter means operably connected with the power sections, said film carrying section including a film drive apparatus for moving the film from a film supply reel to a film take-up reel, means provided in the film drive apparatus for forming a film loop, a film gate for receiving the film loop therethrough, stationary register pin means provided in the film gate means for intermittent engagement with the film loop for intermittently stopping the forward movement of the film loop during exposure of a single frame of the film during activation of the shutter means, eccentric means engagable with a portion of the film loop in a beater action for intermittently pulling a preselected length of the film through the film gate and for intermittently engaging the film with the register pin means, yieldable compensating means receiving the film loop thereover for compensating for inconsistencies in the film and maintaining the film taut in the stopped position of the loop, said compensating means including film engaging spring means complementary to the size of the film for receiving the film thereagainst and supplying yieldable pressure thereon for maintaining said taut condition therefor, and wherein the compensating means comprises a housing means having oppositely disposed substantially flat surfaces of a width corresponding to the width of the film, and said spring means comprises a loop spring means secured to one of said surfaces for receiving the film loop thereagainst, said loop spring means being yieldable upon a pull of the eccentric means on the film loop for yielding with the direction of travel of the loop for maintaining the loop taut in the stopped position thereof and compensating for discrepancies in the film.

5. A high speed motion picture camera as set forth in claim 4 wherein the loop spring means is provided with a highly polished surface for receiving the film loop thereagainst.

6. A high speed motion picture camera as set forth in claim 4 wherein the second of said surfaces is disposed in the proximity of the shutter means for holding the film loop flat during exposure thereof upon activation of the shutter.

7. A high speed motion picture camera comprising a power section operably connected with a film carrying section, release means cooperating between the two sections for selective disengagement therebetween and operable by one hand for facilitating said disengagement, a shutter means operably connected with the power section, said film carrying section including a film drive apparatus for moving the film from a film supply reel to a film take-up reel, means provided in the film drive apparatus for forming a film loop, a film gate for receiving the film loop therethrough, stationary register pin means provided in the film gate means for intermittent engagement with the film loop for intermittently stopping the forward movement of the film loop during exposure of a single frame of the film during activation of the shutter means, eccentric means engagable with a portion of the film loop in a beater action for intermittently pulling a preselected length of the film through the film gate for intermittently engaging the film with the register pin means, yieldable compensating means receiving the film loop thereover for compensating for inconsistencies in the film and maintaining the film taut in the stopped position of the loop, said compensating means including film engaging spring means complementary to the size of the film for receiving the film thereagainst and supplying yieldable pressure thereon for maintaining said taut condition therefor, and wherein the shutter means comprises a rotatable shutter disc having double shutter aperture means provided therein totalling approximately 180° shutter angle for the shutter means, and wherein the adjustment means is operably connected with the shutter disc for providing angular adjustment thereof to improve the exposure efficiency during operation of the camera, and wherein gear train means is operably connected between the shutter disc and the power section for transmitting rotation to the shutter disc and wherein the adjustment means comprises a gear member operably connected with the shutter disc and movable to a first position out of engagement with respect to the gear train means whereby the shutter disc may be angularly adjusted for proper orientation of the shutter aperture means and movable to a second position in engagement with the gear train means for locking the shutter disc in said adjusted position thereof.

8. A high speed motion picture camera as set forth in claim 7 wherein the adjustment means includes slidable locking pin means cooperating with the movable gear member for alternately locking the movable gear in the engaged position and releasing the movable gear for movement to the disengaged position.

* * * * *